(12) United States Patent
Anzai et al.

(10) Patent No.: US 7,885,930 B2
(45) Date of Patent: Feb. 8, 2011

(54) STORAGE SYSTEM, NAS SERVER AND SNAPSHOT ACQUISITION METHOD

(75) Inventors: Tomoya Anzai, Sagamihara (JP); Takahiro Nakano, Yokohama (JP); Yoji Nakatani, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 304 days.

(21) Appl. No.: 11/349,086

(22) Filed: Feb. 8, 2006

(65) Prior Publication Data
US 2007/0136391 A1    Jun. 14, 2007

(30) Foreign Application Priority Data
Dec. 9, 2005    (JP)    ............................... 2005-356941

(51) Int. Cl.
*G06F 7/06* (2006.01)

(52) U.S. Cl. ..................................... 707/639; 707/649

(58) Field of Classification Search ..................... 707/2, 707/9–10, 104.1, 639, 649
See application file for complete search history.

(56) References Cited

U.S. PATENT DOCUMENTS

| | | | |
|---|---|---|---|
| 6,671,773 B2 | 12/2003 | Kazar et al. | |
| 7,007,047 B2* | 2/2006 | Zelenka et al. | ............... 707/204 |
| 7,165,239 B2* | 1/2007 | Hejlsberg et al. | ........... 717/114 |
| 7,191,290 B1* | 3/2007 | Ackaouy et al. | ............. 711/119 |
| 7,653,699 B1* | 1/2010 | Colgrove et al. | ............. 709/213 |
| 2002/0120763 A1* | 8/2002 | Miloushev et al. | .......... 709/230 |
| 2003/0172196 A1* | 9/2003 | Hejlsberg et al. | ........... 709/328 |
| 2004/0186900 A1 | 9/2004 | Nakano et al. | |
| 2004/0226023 A1* | 11/2004 | Tucker | ....................... 719/315 |
| 2004/0243646 A1* | 12/2004 | Teodosiu et al. | ............. 707/200 |
| 2005/0060725 A1* | 3/2005 | D'Souza et al. | ............. 719/331 |
| 2005/0065961 A1* | 3/2005 | Aguren | ....................... 707/102 |
| 2005/0066270 A1* | 3/2005 | Ali et al. | ....................... 715/513 |
| 2005/0091214 A1* | 4/2005 | Probert et al. | ................... 707/9 |
| 2005/0091658 A1* | 4/2005 | Kavalam et al. | ............. 718/104 |
| 2005/0165735 A1* | 7/2005 | Lin et al. | ........................ 707/2 |
| 2006/0053259 A1* | 3/2006 | Berkowitz et al. | ........... 711/162 |
| 2007/0038697 A1* | 2/2007 | Zimran et al. | ................ 709/203 |
| 2007/0055703 A1* | 3/2007 | Zimran et al. | ................ 707/200 |
| 2007/0088702 A1* | 4/2007 | Fridella et al. | ................. 707/10 |
| 2007/0136391 A1* | 6/2007 | Anzai et al. | .................. 707/201 |

\* cited by examiner

*Primary Examiner*—James Trujillo
*Assistant Examiner*—Linh Black
(74) *Attorney, Agent, or Firm*—Antonelli, Terry, Stout & Kraus, LLP.

(57) ABSTRACT

The correspondence relationship between local paths in local namespaces for snapshots FS0-SNAP0, FS1-SNAP0, and FS2-SNAP0 of file systems FS0, FS1, and FS2 and global paths in a global namespace for those snapshots is defined so that the directory configuration in the global namespace of the snapshots FS0-SNAP0, FS1-SNAP0, and FS2-SNAP0 becomes the same as the directory configuration in the global namespace of the file systems FS0, FS1, and FS2.

6 Claims, 17 Drawing Sheets

FIG.18

| SNAPSHOT IDENTIFIER | TIME OF ACQUISITION | FS0 | FS1 | ... |
|---|---|---|---|---|
| SNAP0 | 2005/0702/15:00 | NAS0:/mnt/fs0/snap0/fs0 | NAS1:/mnt/fs1/snap0/fs1 | ... |
| SNAP1 | 2005/0703/15:00 | NAS0:/mnt/fs0/snap1/fs0 | NAS1:/mnt/fs1/snap1/fs1 | ... |
| SNAP2 | 2005/0704/15:00 | — | NAS1:/mnt/fs1/snap2/fs1 | ... |
| .... | .... | .... | .... | ... |

STORAGE SYSTEM, NAS SERVER AND SNAPSHOT ACQUISITION METHOD

CROSS-REFERENCES TO RELATED APPLICATIONS

This application relates to and claims priority from Japanese Patent Application No. 2005-356941, filed on Dec. 9, 2005, the entire disclosure of which is incorporated herein by reference.

BACKGROUND

The present invention relates to a storage system, NAS (Network Attached Storage) server, and snapshot acquisition method, more particularly to a technique for applying a global namespace formed by grouping namespaces of one or more local file systems to snapshots of the respective file systems.

NAS, in which a storage system is connected to a network and managed as a shared disk for computers connected to the network well known. The NAS includes a NAS server having a network interface and a disk drive (or a disk array system combining a number of disk drives) for storing data. In recent years, a plurality of NAS servers has been combined to provide one service to deal with increase in storage capacity and sharing of load. In the above described NAS server management, a global namespace is well known, where namespaces of file systems managed by each NAS server are grouped into one namespace to eliminate the need for changes in the settings in the client required as a result of changes in the configuration of the file systems managed by each NAS server.

For example, U.S. Pat. No. 6,671,773 discloses a technique for presenting file systems including a plurality of network elements and disk elements as a single file system.

Meanwhile, a technique called "snapshot" for taking, at a certain time, the entire image of a file system managed by the NAS for the purpose of backing up or recovering a file or file system is well known. For example, a snapshot of a file system is obtained regularly and mounted to a predetermined local directory. Even if a failure occurs in a file or file system, the broken file or file system can be recovered by using the snapshot taken when that file or file system was working properly. Moreover, a user can perform recovery by him/herself, without an administrator. It is an advantage for the user. Usually, a snapshot is not a copy of data itself, but a technique for copying data link information and maintaining only differential data in updated data. Accordingly, a snapshot can be taken within a comparatively short time. The LVM (Logical Volume Manager) in Linux (Registered Trademark) has a snapshot function.

SUMMARY

However, in the above-described conventional technique, even if snapshots of file systems that provide a global namespace are obtained, a global namespace cannot be applied to those snapshots. Since a global snapshot cannot be obtained, a client has to understand the local namespaces of the file systems to access the snapshots of those file systems.

As shown in FIG. 13, when snapshots of the file systems FS0, FS1, and FS2 managed by the NAS servers NAS0, NAS1, and NAS2 are separately taken and those snapshots are mounted to "/mnt/fs0/snap0/fs0," "/mnt/fs1/snap0/fs1" and "/mnt/fs2/snap0/fs2," the directory configuration is as shown in FIG. 14. A global namespace cannot be applied to the snapshots FS0-SNAP0, FS1-SNAP0, and FS2-SNAP0 of the file systems FS0, FS1, and FS2. If a snapshot of the file "cc" can be accessed with the path "/snap0/fs0/fs2/cc" (the root "/" in the global path being replaced with the root "/snap0" in the snapshot global path), the client does not need to know the local paths for the file systems FS0, FS1, and FS2. It is convenient for the client. However, the file "cc" cannot be accessed with the path "/snap0/fs0/fs2/cc," as shown in FIG. 14. The client needs to know the local paths for the file systems FS0, FS1, and FS2 to access the file "cc," and therefore, the advantage of the global namespace cannot be utilized.

The present invention was devised in light of the above described problem, and an object of the present invention is to apply a global namespace formed by grouping namespaces of one or more local file systems to snapshots of the respective file systems.

To achieve the above-stated object, a storage system according to the present invention includes: a storage device for storing a file; one or more file systems for managing the file; and one or more NAS servers for controlling access from a client to the file system via a global namespace formed by grouping local namespaces of the one or more file systems. The NAS server has a global snapshot construction means for reconfiguring the global namespace so that the directory configuration in the global namespace of a snapshot of a file system obtained by its own or other NAS servers becomes the same as the directory configuration in the global namespace of the file system.

According to the present invention, a global namespace that includes a local namespace of a file system is also applied to a snapshot of the file system.

DESCRIPTION OF THE DRAWINGS

FIG. 18 is a diagram illustrating an example of a management display for snapshots in a management terminal in the present invention.

DETAILED DESCRIPTION

Embodiments of the present invention will be described below with reference to the drawings. The embodiments do not limit the scope of claims, and not all features described in the embodiments are essential to the present invention.

Embodiment 1

In Embodiment 1, one NAS server operates as a master NAS server, which instructs other NAS servers to obtain snapshots, and also creates and transmits snapshot management tables.

Figure 1:
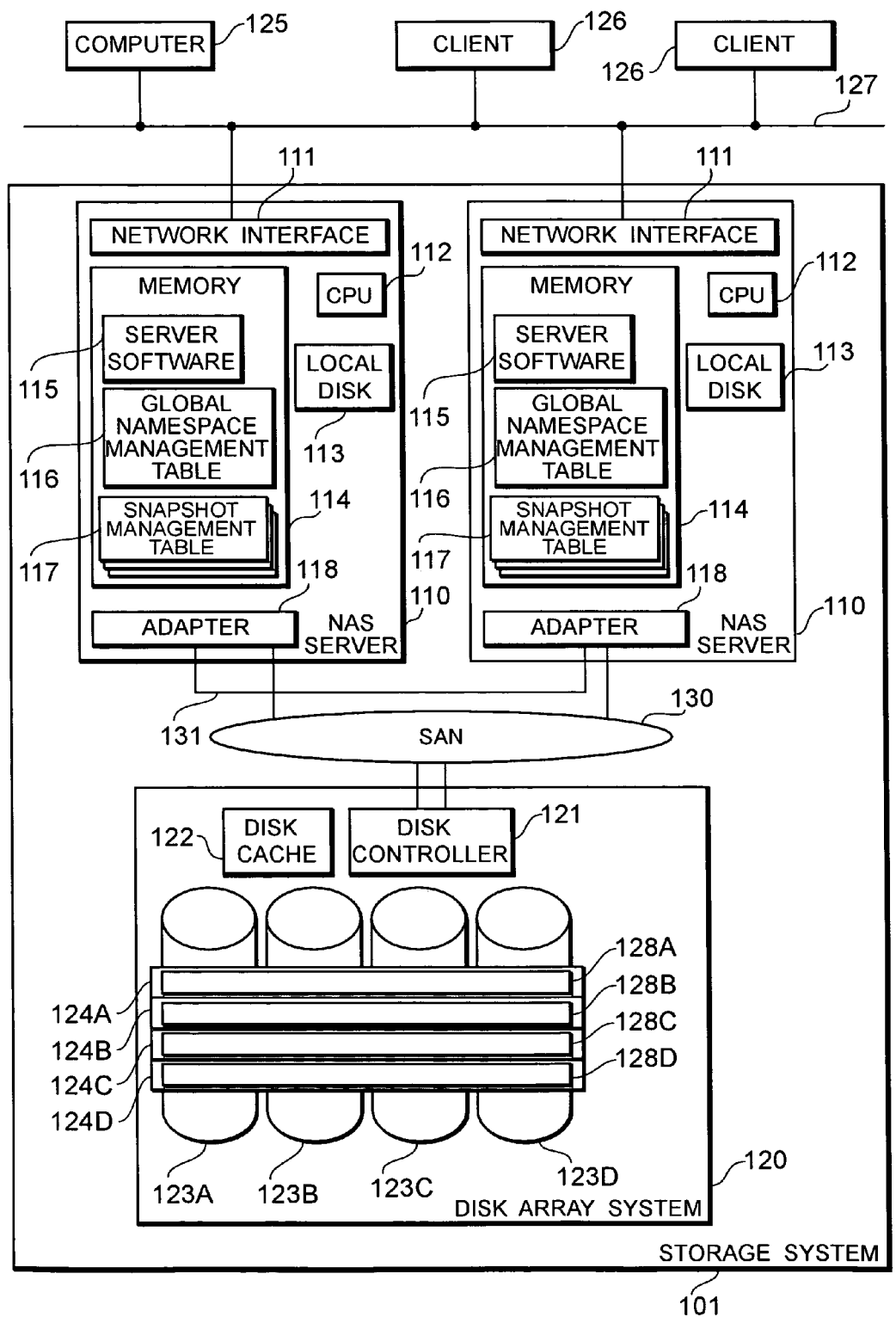
FIG. 1 is a diagram showing the system configuration of a storage system according to Embodiment 1.

FIG. 1 shows the system configuration of a storage system 101 according to Embodiment 1.

The storage system 101 is connected, via an external network 127 such as a LAN (Local Area Network), to one or more clients 126 and a computer 125.

The computer 125 instructs the storage system 101 to generate file systems 128A to 128D in the storage system 101, mount the file systems 128A to 128D, and take a snapshot. The computer 125 is a management terminal for managing the storage system 101. Because the computer 125 is operated by an administrator, it has, at least, a user interface described later.

The client 126 is a computer (NAS client) that accesses files in the storage system 101. More specifically, the client 126 writes files to, and reads files from, the storage system 101. When the client 126 reads/writes a file, the file systems 128A to 128D in the storage system 101 are used. Although two clients 126 are shown in FIG. 1, only one or three or more client(s) 126 may be connected to the storage system 101.

The external network 127 is a network for performing data communication according to a communication protocol, such as TCP/IP.

The storage system 101 is network attached storage (NAS). The storage system 101 includes one or more NAS servers 110; a disk array system 120; and a storage area network (SAN) 130 that mutually connects them.

Each NAS server 110 accesses files in the disk array system 120 in response to file access requests from the client(s) 126.

The storage system 101 includes one or more NAS servers 110. Although the storage system 101 shown in the example in FIG. 1 includes two NAS servers 110, it may include three or more NAS servers. A NAS server is also referred to as a "NAS head" or a "NAS node."

The NAS server 110 includes: a network interface 111; a CPU 112, a local disk 113; a memory 114; and an adapter 118.

The network interface 111 is an interface connected to the external network 127 to communicate with the client(s) 126 and the computer 125.

The CPU 112 is a processor for controlling the operation of the NAS server 110. More specifically, the CPU 112 executes a program stored in the memory 114.

The local disk 113 stores server software 115 and various kinds of management information stored in the memory 114. The memory 114 is, for example, semiconductor memory, and stores programs executed by the CPU 112 and data referred to by the CPU 112. More specifically, the memory 114 stores: the server software 115, a global namespace management table 116, and a snapshot management table 117.

The server software 115 usually includes a plurality of programs executed by the CPU 112. The server software 115 will be described later in detail.

The global namespace management table 116 is a management table including information about the configuration of a global namespace. The global namespace management table 116 is defined in advance by a system administrator, and shared by all NAS servers 110 that provide the global namespace. When the NAS server 110 receives a file access request from the client(s) 126, it refers to the global namespace management table 116. When the directory configuration in the global namespace is changed, the global namespace management table 116 is also changed accordingly.

The snapshot management table 117 is a management table including information about the configuration of a local snapshot and global snapshot. The snapshot management table 117 is created every time a global snapshot is obtained, and referred to when the NAS server 110 receives a request from the client(s) 126 to access the snapshot data.

The adapter 118 is an interface connected to the SAN 130 to communicate with the disk array system 120.

The SAN 130 is a network for performing communication according to fibre channel or SCSI protocol.

The NAS servers 110 are mutually connected via an inter-server network 131 and can communicate with each other. When the content of the global namespace management table 116 in a first NAS server 110 from among a plurality of the NAS servers 110 is updated, the updated content is transmitted via the inter-server network 131 to a second NAS server 110 from among the NAS servers 110, and the content in the global namespace management table 116 in the second NAS server 110 is also updated. The snapshot management table 117 and data required for creating the snapshot management table 117 are also transmitted and received, via the inter-server network 131, to/from the NAS servers 110.

In the present embodiment, the inter-server network 131 that is independent from the SAN 130 and the external network 127 is provided as shown in FIG. 1. However, the NAS servers 110 may also communicate via the SAN 130 or the external network 127. Alternatively, the NAS servers 110 may communicate by using a disk cache 122 in the disk array system 120. For example, when the global namespace management table 116 in a first NAS server 110 from among a plurality of NAS servers 110 is updated, the first NAS server 110 writes the updated content to the disk cache 122. A second NAS server 110 from among the NAS servers 110 then reads the updated content written in the disk cache 122 and updates the global namespace management table 116 in the second NAS server 110. Alternatively, when a number of storage systems 101 are mutually connected, the NAS servers 110 included in the storage systems 101 can use any communication means out of the inter-server network 131, the SAN 130, the external network 131, and the disk cache 122. The present embodiment can be used whichever communication means the NAS server 110 uses.

When a global namespace includes only the file systems managed by some of the NAS servers 110, the global namespace management table 116 and the snapshot management table 117 may be shared only by those NAS servers.

The disk array system 120 includes: a disk controller 121; a disk cache 122; and a plurality of disk drives 123A to 123D.

The disk controller 121 has one or more ports for connection with the SAN 130, communicates with the NAS servers 110, and controls the disk array system 120. More specifically, the disk controller 121 communicates, via the SAN 130, with the NAS servers 110, and controls data input/output to/from the disk drives 123A to 123D in response to file access requests from any NAS server 110.

The disk cache 122 is, for example, semiconductor memory, and temporarily stores data that is to be read and written by the disk drives 123A to 123D.

The disk drives 123A to 123D are storage devices for storing data. The disk drives 123A to 123D may be various kinds of disk drive, such as FC (Fibre Channel) disk drives, SATA (Serial Advanced Technology Attachment) disk drives, PATA (Parallel Advanced Technology Attachment) disk drives, FATA (Fibre Advanced Technology Attachment) disk drives, and SCSI (Small Computer System Interface) disk drives. Although four disk drives 123A to 123D are included in the disk array system 120 in the example shown in FIG. 1, any number of disk drives may be included.

RAID (Redundant Arrays of Inexpensive Disks) configuration can be applied in a storage area provided by the disk drives 123A to 123D. The storage area provided by each of the disk drives 123A to 123D is divided into an arbitrary number of logical devices 124A to 124D. The logical devices 124A to 124D are storage areas managed as logical disk drives by the disk controller 121. When the RAID configuration is applied in the disk drives 123A to 123D, one logical device may be composed of the storage areas of a plurality of disk drives 123A to 123D as shown in FIG. 1. Each of the logical devices 124A to 124D has an arbitrary storage capacity. The server software 115 uses one or more logical devices 124A to 124D as logical volumes for storing the file systems 128A to 128D and snapshots. The NAS servers 110 control file access from the client(s) 126 to the disk array system 120 by using the file systems 128A to 128D created on the logical volume or the snapshots.

The storage system 101 may include a plurality of disk array systems 120. In that case, those disk array systems 120 are connected to the SAN 130. The NAS servers 110 can access any disk array system 120 via the SAN 130.

Figure 2:
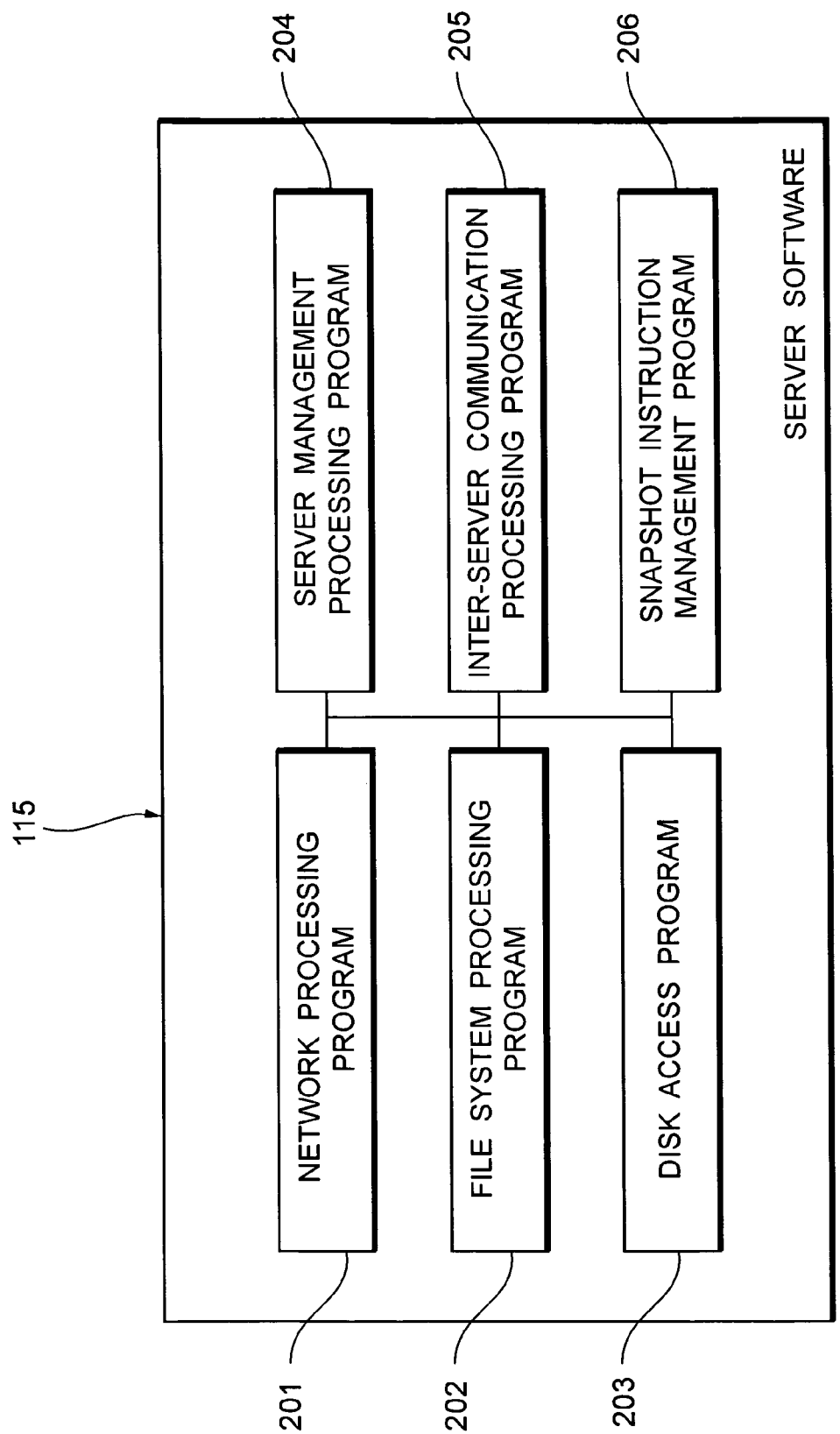
FIG. 2 is a diagram showing the configuration of server software according to Embodiment 1.

FIG. 2 shows the software configuration of the server software 115 according to the present embodiment. The server software 115 includes: a network processing program 201, a file system processing program 202, a disk access program 203, a server management processing program 204, an inter-server communication processing program 205, and a snapshot instruction management program 206.

The network processing program 201 controls communication between the client(s) 126, the computer 125, and the NAS servers 110 via the external network 127.

The file system processing program 202 handles requests for access from each client 126 to files in the file systems 128A to 128D and performs processing concerning the file systems 128A to 128D. For example, the file system processing program 202 generates the file systems 128A to 128D in response to an instruction from the computer 125. Also, upon receiving a file handle request designating a directory name or a file name from each client 126, the file system processing program 202 performs name resolution and returns the file handle. The file system processing program 202 also obtains snapshots of the file systems 128A to 128D, creates the snapshot management table 117, and transmits the snapshot management table 117 to other NAS servers 110, in response to an instruction from the computer 125. The file system processing program 202 functions as a global snapshot construction means.

The disk access program 203 accesses the data in the file systems 128A to 128D in response to access requests from the client(s) 126.

The server management processing program 204 communicates with the computer 125 and configures the settings for the NAS servers 110. For example, the server management processing program 204, receiving an instruction to obtain a snapshot from the computer 125 or other NAS servers 110, communicates the instruction to the file system processing program 202, and obtains the snapshot.

The inter-server communication processing program 205 controls communication between the NAS servers 110 via the inter-server network 131. When the global namespace management table 116 is updated or the snapshot management table 117 is created, the inter-server communication processing program 205 transmits the updated or created content to other NAS servers 110.

The snapshot instruction management program 206 instructs its own or other NAS server 110 to obtain a snapshot. More specifically, the snapshot instruction management program 206 instructs other NAS servers 110 to obtain a snapshot, via the inter-server communication processing program 205. The snapshot instruction management program 206 also schedules snapshot acquisition in its own NAS server 110 and instructs the file system processing program 202 to obtain the snapshot according to the schedule. The snapshot instruction management program 206 functions as snapshot acquisition instruction means.

Figure 3:
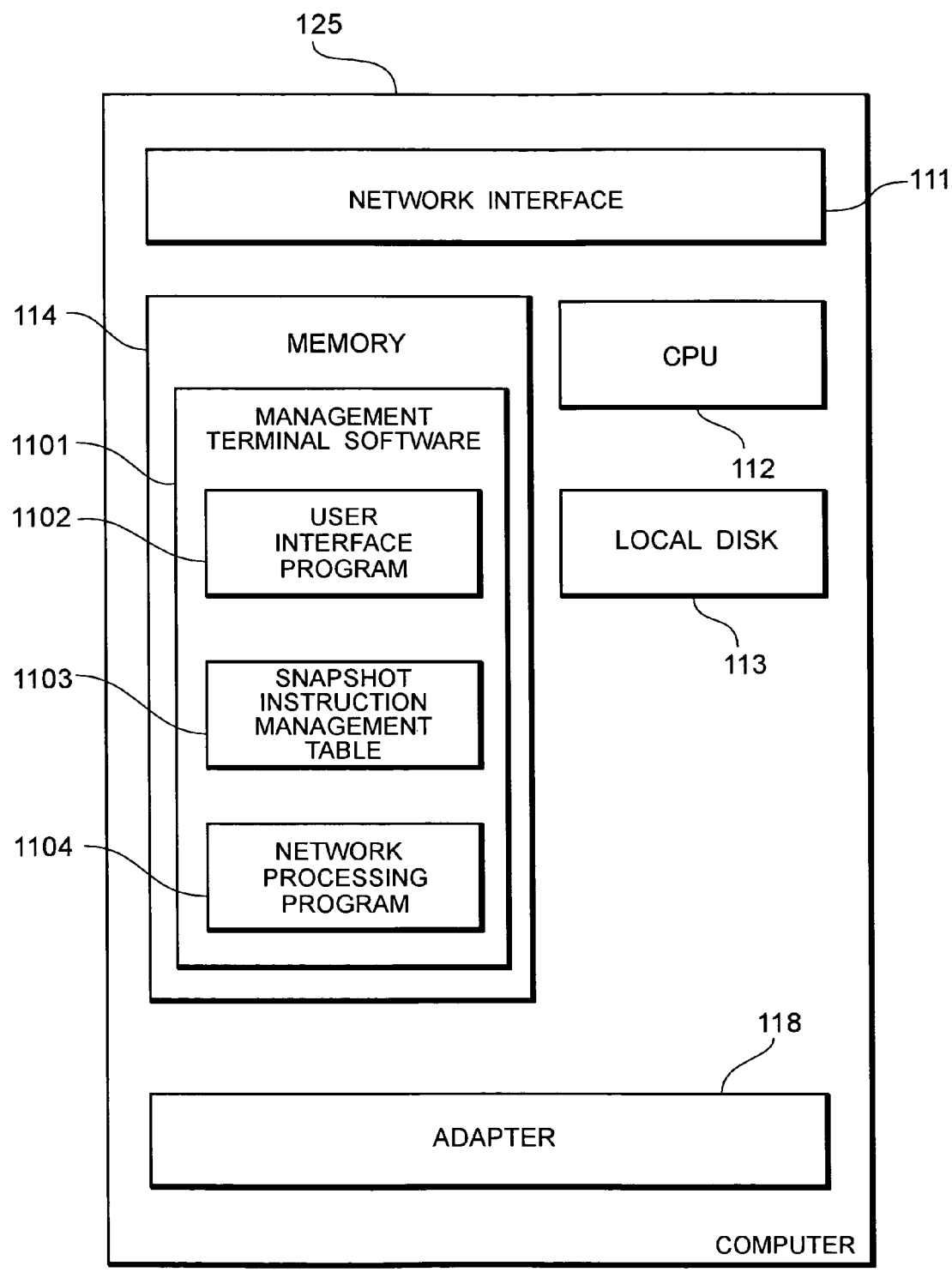
FIG. 3 is a diagram showing the system configuration of a computer according to Embodiment 1.

FIG. 3 shows the system configuration of the computer 125. The computer 125 includes: a network interface 111, a CPU 112, a local disk 113, a memory 114, and an adapter 118. Its hardware configuration is the same as that of the NAS server 110. The memory 114 in the computer 125 stores management terminal software 1101. The management terminal software 1101 includes: a user interface program 1102; a snapshot instruction management program 1103; and a network processing program 1104. The memory 114 in the computer 125 may store the global namespace management table 116 and/or the snapshot management table 117. The adapter 118 is not always necessary.

The user interface program 1102 receives processing instructions from a system administrator and displays processing results.

The snapshot instruction management program 1103 instructs the NAS servers 110 to obtain snapshots. The snapshot instruction management program 1103 schedules the timing to instruct the NAS servers 110 to obtain the snapshot, and instructs the file system processing program 202 in each NAS server 110 to obtain the snapshot according to the predetermined schedule. The snapshot instruction management program 1103 creates the snapshot management table 117 based on information from the NAS server 110 that has been instructed to obtain the snapshot, and transmits the table to the NAS server 110.

The network processing program 1104 controls communication between the computer 125 and the NAS servers 110 via the external network 127.

Figure 4:
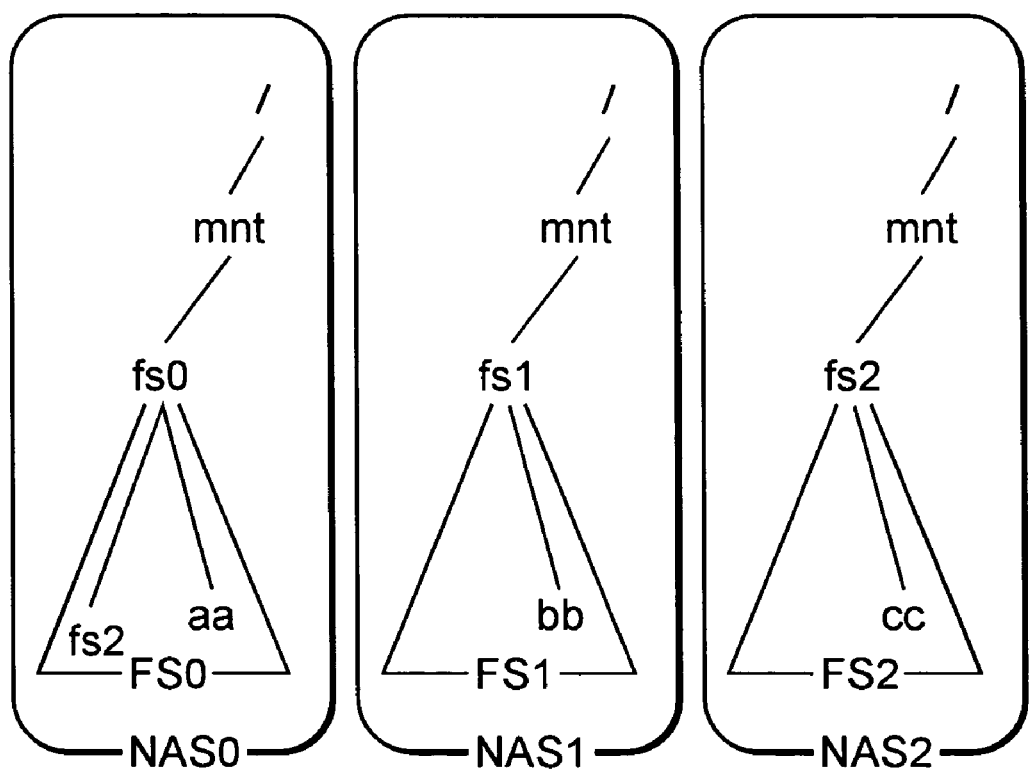
FIG. 4 is a diagram illustrating the directory configuration of a file system according to Embodiment 1.

FIG. 4 shows the directory configuration of a local file system according to the present embodiment. In FIG. 4, three NAS servers 110 (respectively referred to as NAS0, NAS1, and NAS2 in some cases, for the interest of convenience) are shown. In NAS 0, the file system FS0 is mounted to a directory path represented by "/mnt/fs0," and the file "aa" in the file system FS0 can be accessed with the path represented by "/mnt/fs0/aa."

Although, for ease of explanation, one NAS server manages one file system in the present embodiment, one NAS server may manage a plurality of file systems.

Figure 5:
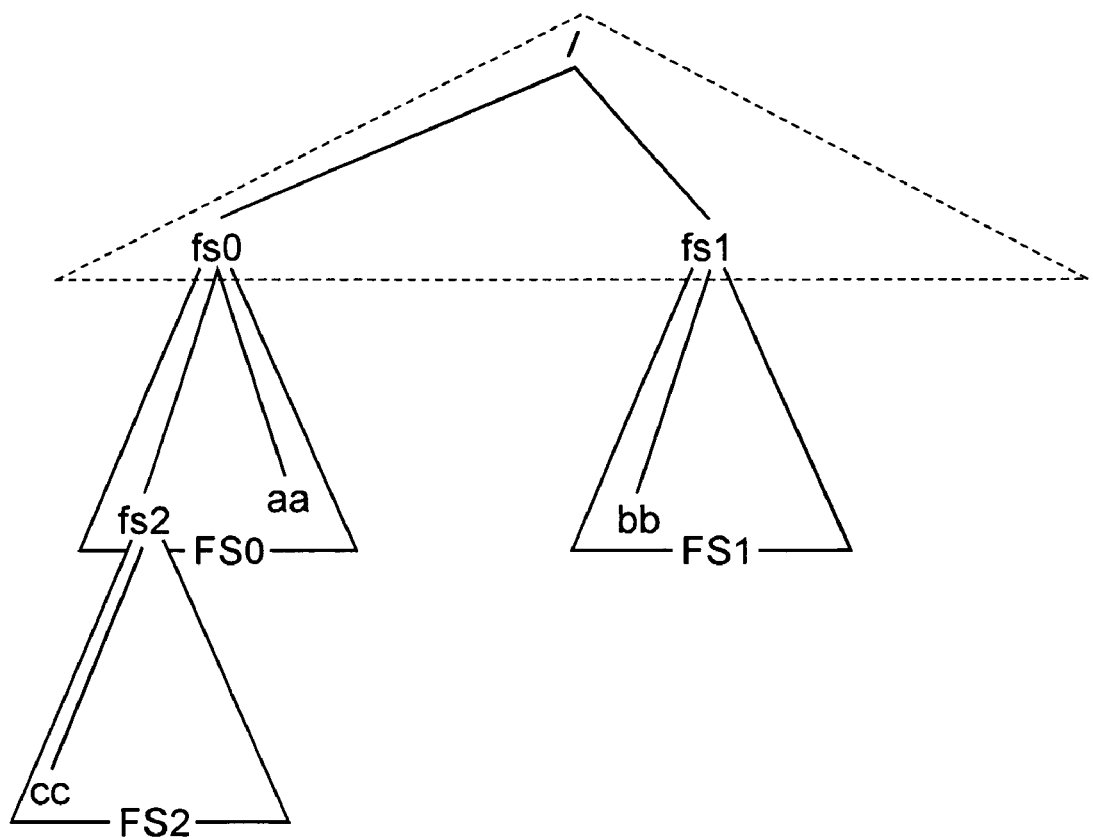
FIG. 5 is a diagram illustrating the directory configuration of a global namespace according to Embodiment 1.

FIG. 5 shows the directory configuration of a global namespace according to the present embodiment. In FIG. 5, a global namespace is formed by grouping the local namespaces of the file systems FS0, FS1, and FS2 provided by NAS0, NAS1, and NAS 2 shown in FIG. 4. For example, the file "cc" in the file system FS2 can be accessed with a path (global path) represented by "/fs0/fs2/cc."

The part enclosed by a dotted line is a namespace referred to as a pseudo file system in NFSv4, based on directory paths for connecting separate namespaces. The pseudo file system looks like common directories for clients.

Figure 7:
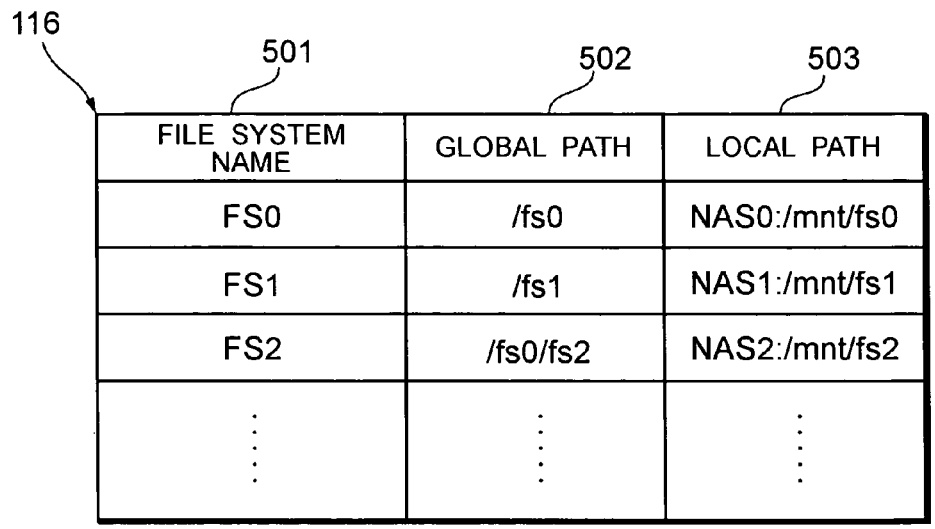
FIG. 7 is a diagram illustrating a global namespace management table according to Embodiment 1.

FIG. 7 shows the global namespace management table 116 according to the present embodiment. The global namespace management table 116 includes: a file system name 501, a global path 502, and a local path 503. The file system name 501 is the name of a local file system. The global path 502 is a directory path indicating the connection point in the global namespace of a file system specified by the file system name 501. The local path 503 is a directory path indicating the mount point on the NAS server of a file system specified by the file system name 501. For example, the file system FS0 is connected to the directory with the global path 502 represented by "/fs0" in the global namespace, and mounted to a directory with the local path 503 represented by "/mnt/fs0" on the NAS server 0.

By sharing the global namespace management table 116 among all NAS servers that provide the global namespace and allocating the different file accesses from the clients 126 to the respective NAS servers 110, the file systems FS0, FS1, and FS2 provided by the NAS servers 110 shown in FIG. 4 can be presented to the clients 126 as a single namespace shown in FIG. 5.

Figure 6:
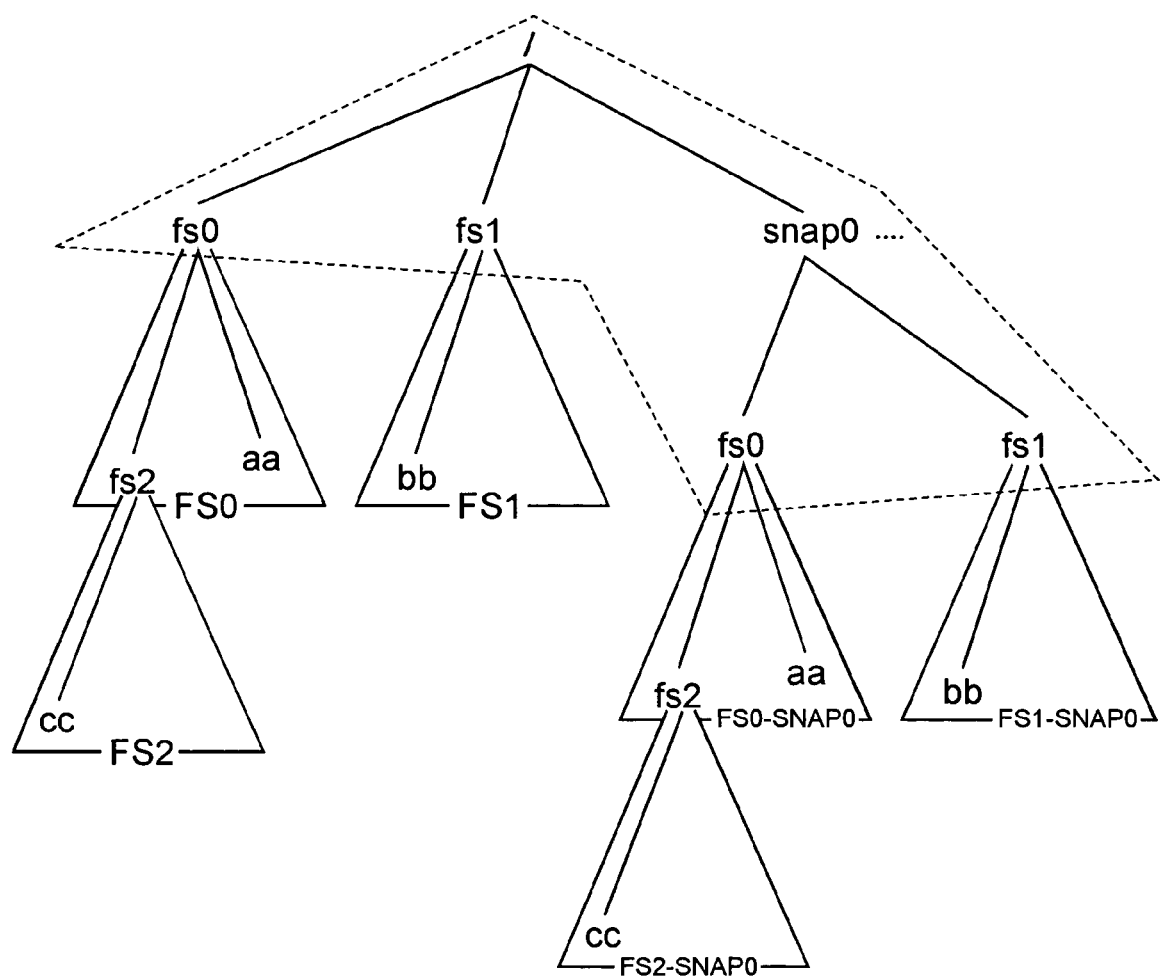
FIG. 6 is a diagram illustrating the directory configuration of a global namespace of a snapshot according to Embodiment 1.

FIG. 6 shows the directory configuration in the global namespace based on the snapshot according to the present embodiment. In the example shown in FIG. 6, snapshots FS0-SNAP0, FS1-SNAP0, and FS2-SNAP0 of the respective file systems FS0, FS1, and FS2 are connected to the global path represented by "/snap0," and the directory configuration of each of the snapshots FS0-SNAP0, FS1-SNAP0, and FS2-SNAP0 (the directory configuration with the root (starting point) "/snap0") is the same as the directory configuration in the global namespace (the directory configuration with the root "/") including the local namespaces of the file systems FS0, FS1, and FS2.

Figure 8:
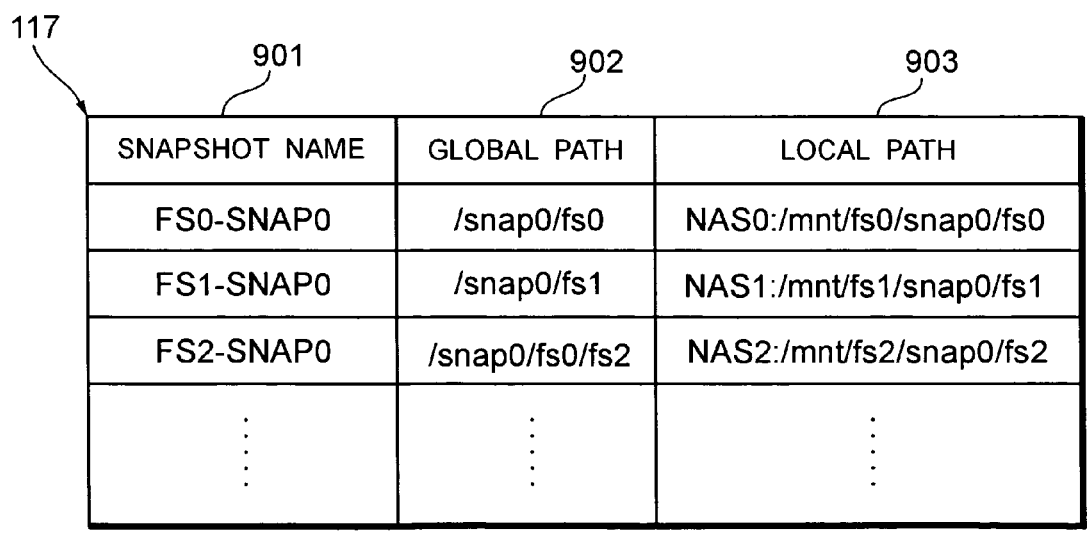
FIG. 8 is a diagram illustrating a snapshot management table according to Embodiment 1.

FIG. 8 shows a snapshot management table 117 according to the present embodiment. The snapshot management table 117 includes: a snapshot name 901, a global path 902, and a local path 903. The snapshot name 901 is a name of a snapshot of a local file system. The global path 902 is a directory path indicating the connection point in the global namespace of a snapshot specified by the snapshot name 901. The local path 903 is a directory path indicating the mount point on the NAS server of a snapshot specified by the snapshot name 901. For example, FS0-SNAP0 is a snapshot that is mounted to a directory with the global path 902 represented by "/snap0/fs0" in the global namespace and mounted to a directory with the local path 903 represented by "/mnt/fs0/snap0/fs0" on the NAS server 0.

As described above, access via the global namespace to a snapshot can be provided to the clients 126 by defining the correspondence relationship (i.e. defining the connection point in the global namespace of the snapshots FS0-SNAP0, FS1-SNAP0, and FS-SNAP0) between the local paths for the snapshots FS0-SNAP0, FS1-SNAP0, and FS2-SNAP0 in the local namespace and the global paths for those snapshots in the global namespace so that the directory configuration in the global namespace of the snapshots FS0-SNAP0, FS1-SNAP0, and FS2-SNAP0 of the file systems FS0, FS1, and FS2 obtained by the NAS server 110 becomes the same as the directory configuration in the global namespace of the file systems FS0, FS1, and FS2.

Figure 9:
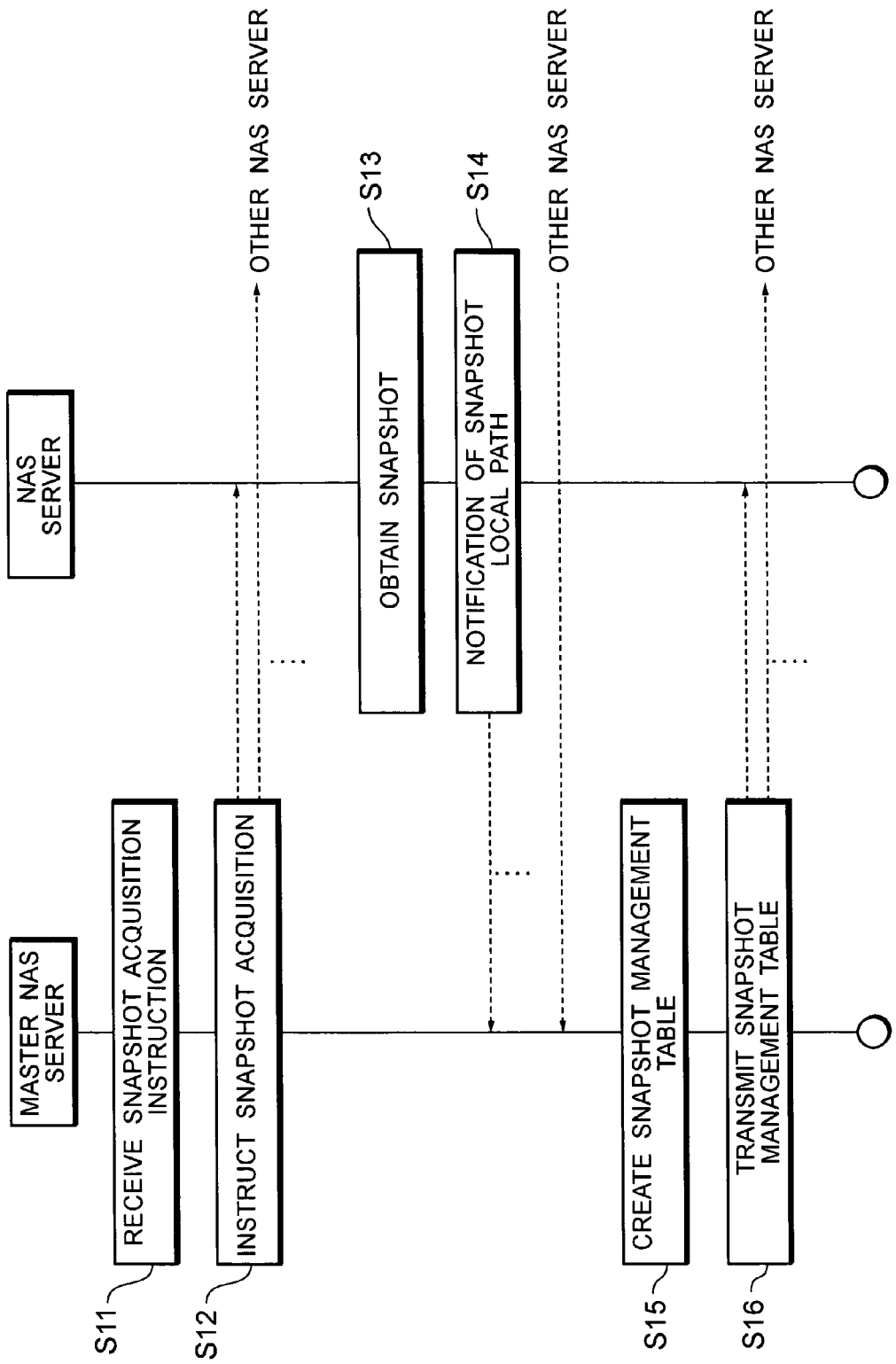
FIG. 9 is a sequence chart showing snapshot acquisition processing according to Embodiment 1.

FIG. 9 is a sequence chart showing snapshot acquisition processing according to the present embodiment. When a system manager operates the computer 125 to instruct the snapshot acquisition, the computer 125 gives a snapshot acquisition instruction to any one of the NAS servers 110 (referred to as a "master NAS server") that provide a global namespace (S11). The master NAS server receives the snapshot acquisition instruction in cooperation with the server management processing program 204 and the snapshot instruction management program 206.

The master NAS server manages and transmits the global namespace management table 116 and the snapshot management table 117. The master NAS server may be determined in advance from among a plurality of NAS servers; or NAS server 110 that has been accessed first by the computer 125.

Next, the master NAS server refers to the global namespace management table 116 that its own apparatus has, and sequentially or simultaneously instructs the file system processing program 202 in all NAS servers 110, which manage their respective file systems described in the global namespace management table 116, to obtain a snapshot of each file system (S12). As described above, the snapshot acquisition instruction program 206 in the master NAS server is transmitted to the file system processing program 202 in the designated NAS server via the inter-server communication program 205 in the master NAS and that in the designated NAS server.

In the case where the master NAS server instructs its own apparatus to obtain a snapshot, the snapshot acquisition instruction is transmitted from the snapshot acquisition instruction program 206 to the file system processing program 202 in the master NAS server.

The NAS server 110, receiving the snapshot acquisition instruction, activates the file system processing program 202 and performs processing for acquiring a snapshot of the designated file system (S13).

Next, that NAS server 110 mounts the obtained snapshot to a predetermined local directory and notifies the master NAS server of the local path for that snapshot (S14).

The master NAS server creates a snapshot management table 117 based on that global namespace management table 116 (S15). In other words, the master NAS server obtains the global path 902 for the snapshot name 901 (The snapshot name may be set arbitrarily, as long as it can be recognized by a manager or the client(s) 126.) corresponding to the file system name 501 by replacing the root "/" in the global path 502 with the root "/snap0" in the global path 902 (The root of the global path 902 may be set to an arbitrary directory.) for the snapshot, writes that global path 902 to the snapshot management table 117, and writes the local path 903 to the snapshot management table 117 based on the information about the local path for the snapshot it was sent from by the NAS servers 110 in S14.

Even when the notification of the local path from some of the NAS servers is delayed, the master NAS server can easily determine the instruction the notification has been made for, from "snap0" included in the local path sent from each NAS server, because the master NAS server instructs each NAS server to obtain the snapshot identified by, e.g. SNAP0, or to mount the obtained snapshot to the local path including "snap0" in the present embodiment.

When the local path has not been sent from some of the NAS servers even after a certain period of time has passed since the master NAS server instructed the NAS servers to obtain a snapshot, the entire global namespace of the snapshot at this moment may be made invalid and processing after S15 may be skipped. Alternatively, the global namespace may be constructed to include only the local namespaces of the snapshots that have been communicated.

Figure 17:
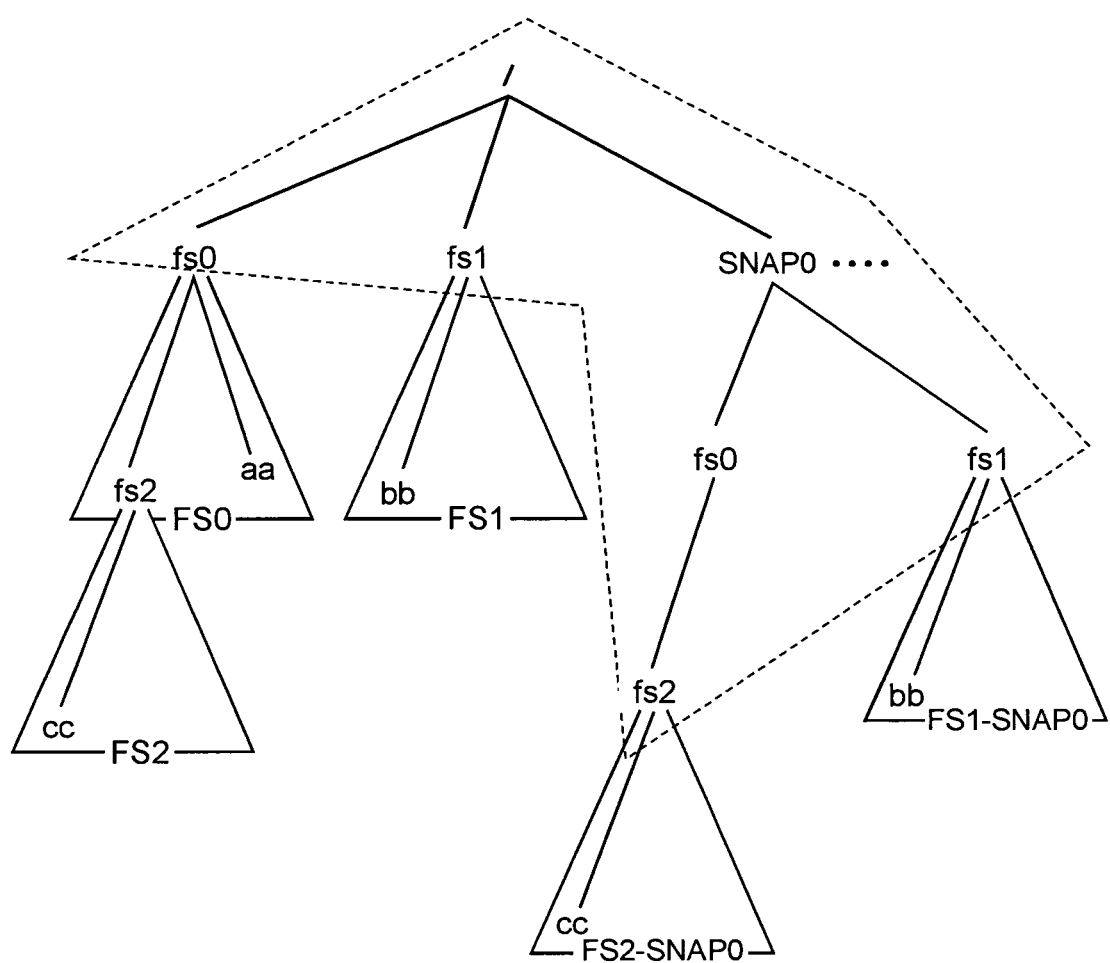
FIG. 17 is a diagram illustrating an example of the directory configuration of a global namespace where some of one or a plurality of snapshots are lacking in the present invention.

However, when the file systems are hierarchically connected in the global namespace as FS0 and FS2 in the present embodiment, and the relevant NAS server fails to obtain a snapshot of the upper file system, or the snapshot FS0-SNAP0 of FS0 in this example, and do not communicate the local path of that snapshot, FS2-SNAP0 cannot be connected to the global namespace. In this case, the global namespace can be constructed to include the local namespaces of successfully obtained FS2-SNAP0 and FS1-SNAP0 by defining the directory "/snap0/fs0/fs2" for connecting FS2-SNAP0 as a pseudo-file system, as shown in the example in FIG. 17. At this moment, only the rows corresponding to the snapshot names 901 (FS1-SNAP0 and FS2-SNAP0) in the snapshot management table 117 shown in FIG. 8 are filled.

In the sequence chart shown in FIG. 9, processing in only one NAS server other than the master NAS server is shown, for ease of explanation. When there is a plurality of NAS servers besides the master NAS server, those other NAS servers execute the same processing.

When the snapshot acquisition for all file systems is finished and the snapshot management table 117 is completed, the master NAS server transmits the snapshot management table 117 created in S15 to all NAS servers that provide the global namespace (S16). Even when the snapshot acquisition for some file systems fails as described above and the snapshot management table 117 is created using only the successfully obtained snapshots, the master NAS server transmits the snapshot management table 117 to all NAS servers including those that manage the snapshots that have not been successfully obtained in S16.

After that, the global namespace can be constructed in the storage system 101 to include local namespaces of snapshots by using the snapshot management table 117. Accordingly, access from the clients 126 to the snapshots becomes easier.

FIGS. 1 to 8 apply not only to Embodiment 1, but also to other embodiments.

Embodiment 2

In Embodiment 2, the computer 125 instructs each NAS server 110 to obtain a snapshot, creates the snapshot management table 117 based on snapshot local paths received from the NAS servers 110 in response to the above instruction, and transmits the snapshot management table 117 to the NAS servers 110. The snapshot instruction management program 1103 in the computer 125 instructs snapshot acquisition, and creates and transmits the snapshot management table 117. The global namespace management table 116 may be managed in the computer 125, or the computer 125 may obtain the global namespace management table 116 from any of the NAS servers 110 when creating the snapshot management table 117.

Figure 10:
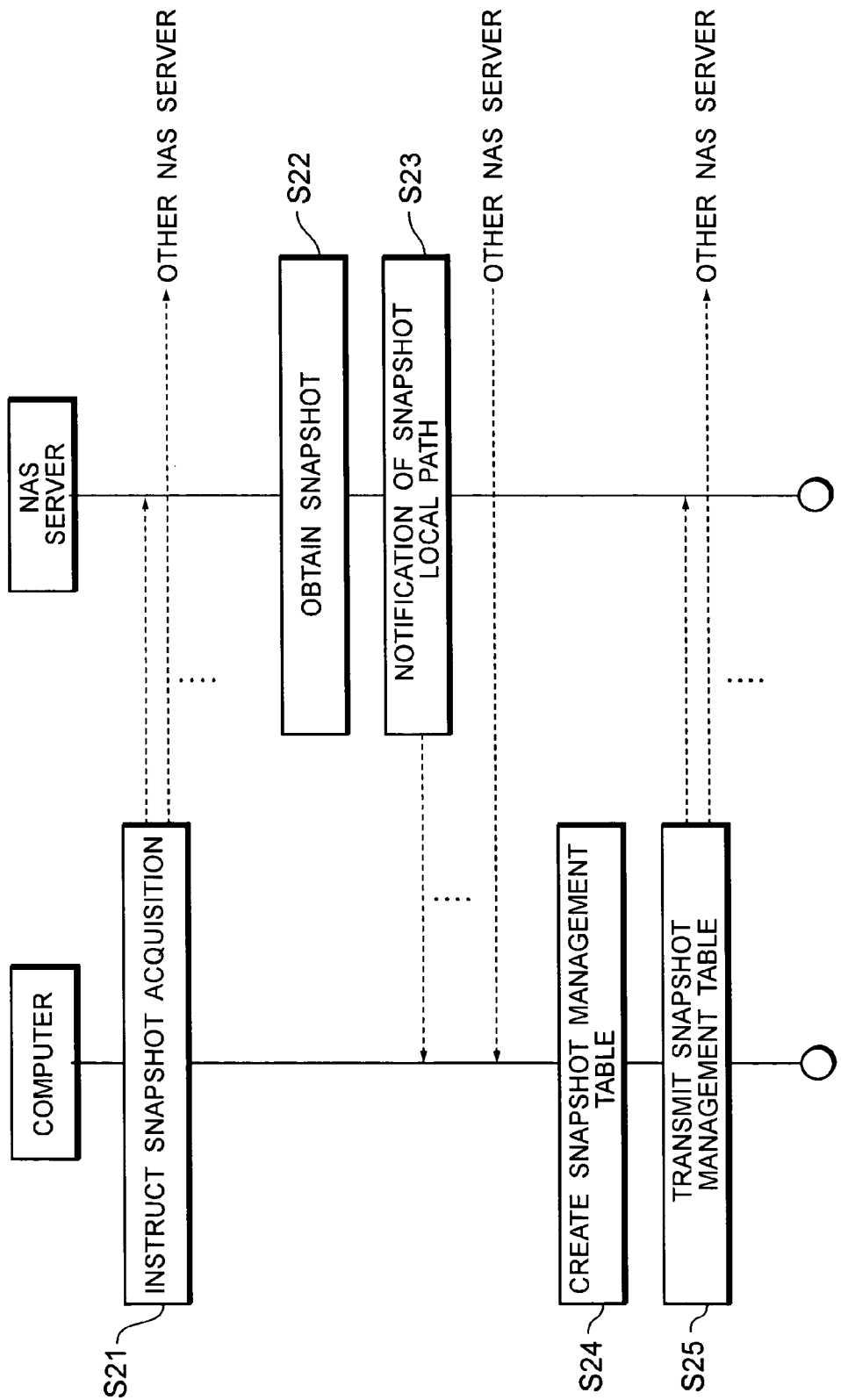
FIG. 10 is a sequence chart showing snapshot acquisition processing according to Embodiment 2.

FIG. 10 is a sequence chart showing snapshot acquisition processing according to the present embodiment. When the system administrator instructs a user interface program 1102 in the computer 125 to obtain a snapshot, the snapshot instruction management program 1103 refers to the global namespace management table 116, and sequentially or simultaneously instructs the file system processing programs 202 in all NAS servers 110 that manage the file systems written in the global namespace management table 116 to obtain a snapshot of their respective file systems (S21). The snapshot acquisition instruction from the snapshot instruction management program 1103 in the computer 125 is transmitted, via the network processing program 1104 in the computer 125 and the inter-server communication processing program 205 in the designated NAS server 110, to the file system processing program 202 in the designated NAS server 110.

The NAS server 110, receiving the snapshot acquisition instruction, activates the file system processing program 202 and performs processing for acquiring a snapshot of the designated file system (S22).

Next, that NAS server 110 mounts the obtained snapshot to a predetermined local directory and notifies the master NAS server of the local path for that snapshot (S23).

The computer 125 creates a snapshot management table 117 based on the global namespace management table 116 (S24). In other words, the computer 125 obtains the global path 902 for the snapshot name 901 (The snapshot name may be set arbitrarily, as long as it can be recognized by a manager or the client(s) 126.) corresponding to the file system name 501 by replacing the root "/" in the global path 502 with the root "/snap0" in the global path 902 (The root of the global path 902 may be set to an arbitrary directory.) for the snapshot, writes that global path 902 to the snapshot management table 117, and writes the local path 903 to the snapshot management table 117 based on the information about the local path for the snapshot it was sent from by the NAS servers 110 in S23.

Even when the notification of the local path from some of the NAS servers is delayed, the computer 125 can easily determine the instruction the notification has been made for, from "snap0" included in the local path sent from each NAS server, because the computer 125 instructs each NAS server to obtain the snapshot identified by, e.g. SNAP0, or to mount the obtained snapshot to the local path including "snap0" in the present embodiment.

When the local path has not been sent from some of the NAS servers even after a certain period of time has passed since the computer 125 instructed the NAS servers to obtain a snapshot, the entire global namespace of the snapshot at this moment may be made invalid and processing after S24 may be skipped. Alternatively, the global namespace may be constructed to include only the local namespaces of the snapshots that have been communicated.

However, when the file systems are hierarchically connected in the global namespace as FS0 and FS2 in the present embodiment, and the relevant NAS server fails to obtain a snapshot of the upper file system, or the snapshot FS0-SNAP0 of FS0 in this example, and do not communicate the local path of that snapshot, FS2-SNAP0 cannot be connected to the global namespace. In this case, the global namespace can be constructed to include the local namespaces of successfully obtained FS2-SNAP0 and FS1-SNAP0 by defining the directory "/snap0/fs0/fs2" for connecting FS2-SNAP0 as a pseudo-file system, as shown in the example in FIG. 17. At this moment, only the rows corresponding to the snapshot names FS1-SNAP0 and FS2-SNAP0 in the snapshot management table 117 shown in FIG. 8 are filled.

In the sequence chart shown in FIG. 10, processing in only one NAS server is shown, for ease of explanation. When there is a plurality of NAS servers, those other NAS servers execute the same processing.

When the snapshot acquisition for all file systems is finished and the snapshot management table 117 is completed, the computer 125 transmits the snapshot management table 117 created in S24 to all NAS servers that provide the global namespace (S25). Even when the snapshot acquisition for some file systems fails as described above and the snapshot management table 117 is created using only the successfully obtained snapshots, the computer 125 transmits the snapshot management table 117 to all NAS servers including those that manage the snapshots that have not been successfully obtained in S25.

After that, the global namespace can be constructed in the storage system 101 to include local namespaces of snapshots by using the snapshot management table 117. Accordingly, access from the clients 126 to the snapshots becomes easier.

Embodiment 3

In Embodiment 3, the NAS servers 110 operate synchronously with each other and are scheduled to obtain their respective snapshots at the same predetermine time. One of a plurality of NAS servers 110 operates as a master NAS server, and creates the snapshot management table 117 and transmits the table to the other NAS servers 110. In the snapshot instruction management program 206 in each NAS server 110, the timing (or hour) of acquiring a snapshot of each file system is preset and all NAS servers that provide the global namespace operate synchronously with each other.

Figure 11:
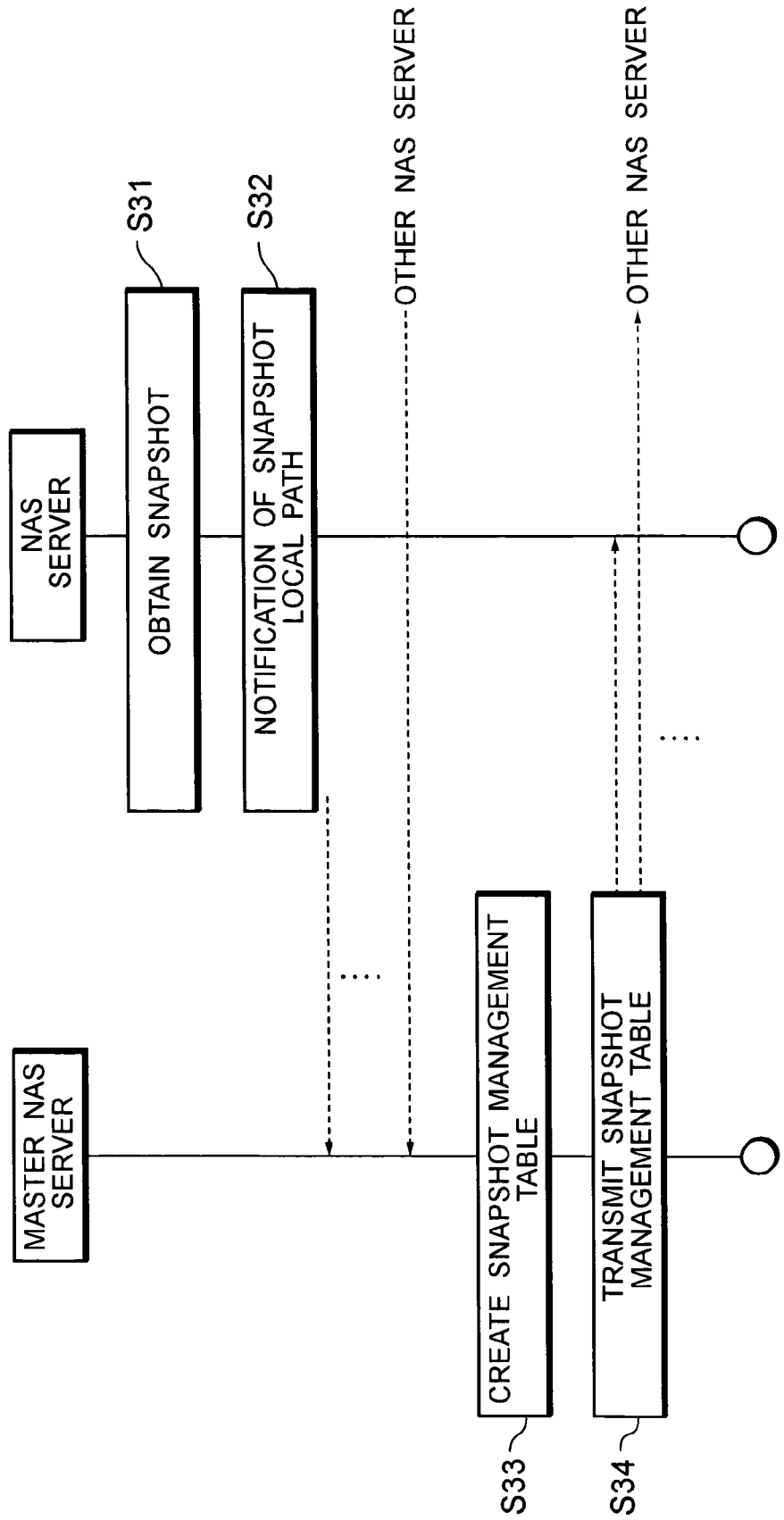
FIG. 11 is a sequence chart showing snapshot acquisition processing according to Embodiment 3.

FIG. 11 is a sequence chart showing snapshot acquisition processing according to the present embodiment. In each NAS server 110, a snapshot acquisition instruction is transmitted at the same predetermined time from the snapshot instruction management program 206 to the file system processing program 202 in its own apparatus, and the file system processing program 202 performs processing for acquiring a snapshot for a file system (S31).

Next, each NAS server 110 mounts the obtained snapshot to a predetermined local directory and notifies the master NAS server of the local path for the snapshot (S32).

In the sequence chart shown in FIG. 11, only processing in one NAS server other than the master NAS server is shown, for ease of explanation. When there are several NAS servers besides the master NAS server, those other NAS servers perform the same processing.

Next, the master NAS server creates a snapshot management table 117 based on the global namespace management table 116 (S33). In other words, the master NAS server obtains the global path 902 for the snapshot name 901 (The snapshot name may be set arbitrarily, as long as it can be recognized by a manager or the client(s) 126.) corresponding to the file system name 501 by replacing the root "/" in the global path 502 with the root "/snap0" in the global path 902 (The root of the global path 902 may be set to an arbitrary directory.) for the snapshot, writes that global path 902 to the snapshot management table 117, and writes the local path 903 to the snapshot management table 117 based on the information about the local path for the snapshot it was sent from by the NAS servers 110 in S32.

Even when the notification of the local path from some of the NAS servers is delayed, the master NAS server can easily determine the instruction the notification has been made for, from "snap0" included in the local path sent from each NAS server, because the master NAS server instructs each NAS server to obtain the snapshot identified by, e.g. SNAP0, or to mount the obtained snapshot to the local path including "snap0" in the present embodiment.

When the local path has not been sent from some of the NAS servers even after a certain period of time has passed since the master NAS server instructed the NAS servers to obtain a snapshot, the entire global namespace of the snapshot at this moment may be made invalid and processing after S33 may be skipped. Alternatively, the global namespace may be constructed to include only the local namespaces of the snapshots that have been communicated.

However, when the file systems are hierarchically connected in the global namespace as FS0 and FS2 in the present embodiment, and the relevant NAS server fails to obtain a snapshot of the upper file system, or the snapshot FS0-SNAP0 of FS0 in this example, and do not communicate the local path of that snapshot, FS2-SNAP0 cannot be connected to the global namespace. In this case, the global namespace can be constructed to include the local namespaces of successfully obtained FS2-SNAP0 and FS1-SNAP0 by defining the directory "/snap0/fs0/fs2" for connecting FS2-SNAP0 as a pseudo-file system, as shown in the example in FIG. 17. At this moment, only the rows corresponding to the snapshot names FS1-SNAP0 and FS2-SNAP0 in the snapshot management table 117 shown in FIG. 8 are filled.

When the snapshot acquisition for all file systems is finished and the snapshot management table 117 is completed, the master NAS server transmits the snapshot management table 117 created in S33 to all NAS servers that provide the global namespace (S34). Even when the snapshot acquisition for some file systems fails as described above and the snapshot management table 117 is created using only the successfully obtained snapshots, the master NAS server transmits the snapshot management table 117 to all NAS servers including those that manage the snapshots that have not been successfully obtained in S34.

After that, the global namespace can be constructed in the storage system 101 to include local namespaces of snapshots by using the snapshot management table 117. Accordingly, access from the clients 126 to the snapshots becomes easier.

Embodiment 4

In Embodiment 4, the NAS servers 110 operate synchronously with each other and are scheduled to obtain their respective snapshots at a predetermined time, and the computer 125 creates the snapshot management table 117 and transmits the table to the other NAS servers 110. The global namespace management table 116 may be managed in the computer 125. Alternatively, the computer 125 may obtain the global namespace management table 116 from any of the NAS servers 110 when creating the snapshot management table 117.

Figure 12:
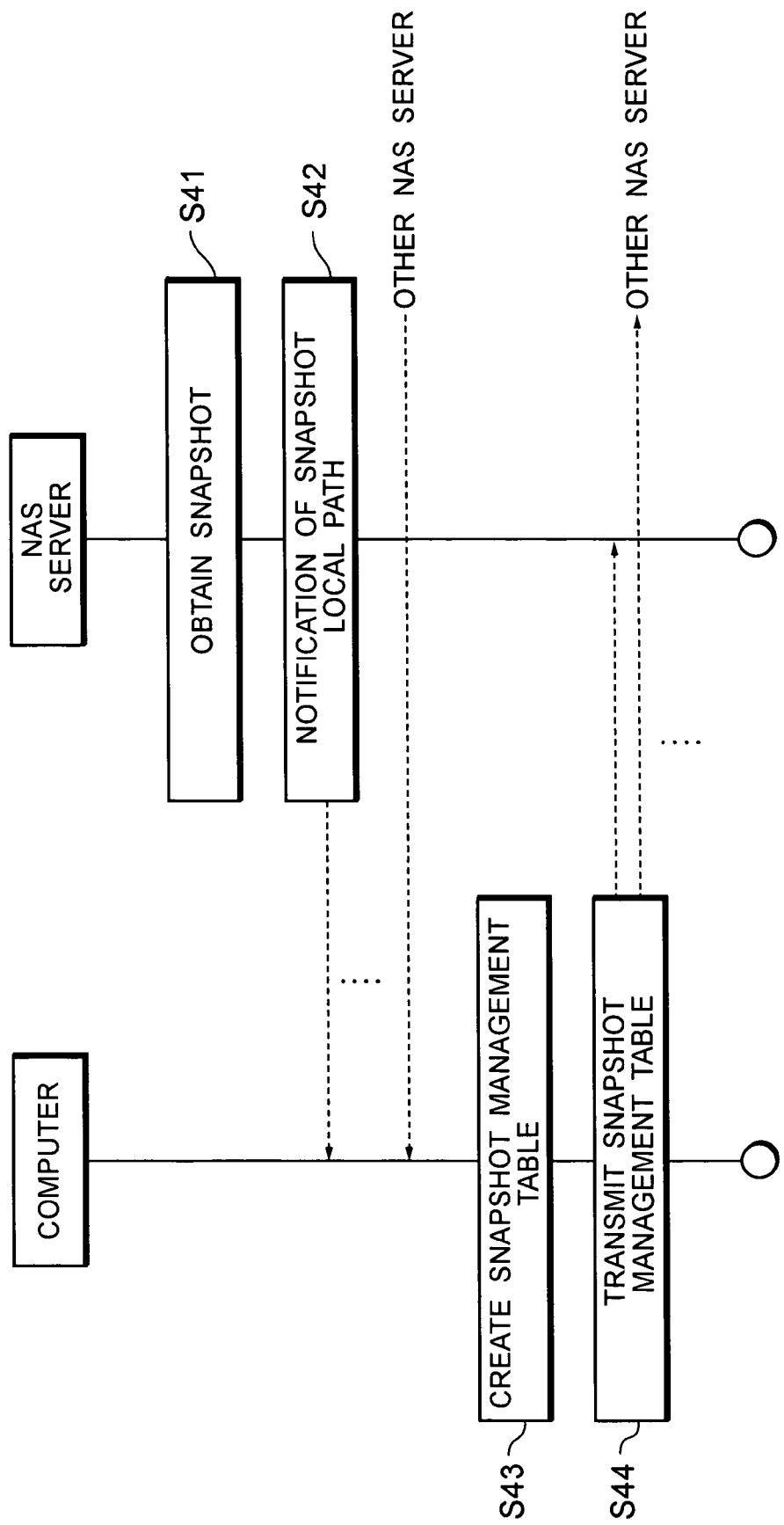
FIG. 12 is a sequence chart showing snapshot acquisition processing according to Embodiment 4.

FIG. 12 is a sequence chart showing snapshot acquisition processing according to the present embodiment. In each NAS server 110, a snapshot acquisition instruction is transmitted at a pre-synchronized time from the snapshot instruction management program 206 to the file system processing program 202 in its own apparatus, and the file system processing program 202 performs processing for acquiring a snapshot for a file system (S41).

Next, each NAS server 110 mounts the obtained snapshot to a predetermined local directory and notifies the computer 125 of the local path for the snapshot (S42).

In the sequence chart shown in FIG. 12, only processing in one NAS server is shown, for ease of explanation. When there are several NAS servers, those NAS servers perform the same processing.

Next, the computer 125 creates a snapshot management table 117 based on the global namespace management table 116 (S43). In other words, the computer 125 obtains the global path 902 for the snapshot name 901 (The snapshot name may be set arbitrarily, as long as it can be recognized by a manager or the client(s) 126.) corresponding to the file system name 501 by replacing the root "/" in the global path 502 with the root "/snap0" in the global path 902 (The root of the global path 902 may be set to an arbitrary directory.) for the snapshot, writes that global path 902 to the snapshot management table 117, and writes the local path 903 to the snapshot management table 117 based on the information about the local path for the snapshot it was sent from by the NAS servers 110 in S42.

Even when the notification of the local path from some of the NAS servers is delayed, the computer 125 can easily determine the instruction the notification has been made for, from "snap0" included in the local path sent from each NAS server, because the computer 125 instructs each NAS server to obtain the snapshot identified by, e.g. SNAP0, or to mount the obtained snapshot to the local path including "snap0" in the present embodiment.

When the local path has not been sent from some of the NAS servers even after a certain period of time has passed since the computer 125 instructed the NAS servers to obtain a snapshot, the entire global namespace of the snapshot at this moment may be made invalid and processing after S43 may be skipped. Alternatively, the global namespace may be constructed to include only the local namespaces of the snapshots that have been communicated.

However, when the file systems are hierarchically connected in the global namespace as FS0 and FS2 in the present embodiment, and the relevant NAS server fails to obtain a snapshot of the upper file system, or the snapshot FS0-SNAP0 of FS0 in this example, and do not communicate the local path of that snapshot, FS2-SNAP0 cannot be connected to the global namespace. In this case, the global namespace can be constructed to include the local namespaces of successfully obtained FS2-SNAP0 and FS1-SNAP0 by defining the directory "/snap0/fs0/fs2" for connecting FS2-SNAP0 as a pseudo-file system, as shown in the example in FIG. 17. At this moment, only the rows corresponding to the snapshot names FS1-SNAP0 and FS2-SNAP0 in the snapshot management table 117 shown in FIG. 8 are filled.

When the snapshot acquisition for all file systems is finished and the snapshot management table 117 is completed, the computer 125 transmits the snapshot management table 117 created in S43 to all NAS servers that provide the global namespace (S44). Even when the snapshot acquisition for some file systems fails as described above and the snapshot management table 117 is created using only the successfully obtained snapshots, the master NAS server transmits the snapshot management table 117 to all NAS servers including those that manage the snapshots that have not been successfully obtained in S44.

After that, the global namespace can be constructed in the storage system 101 to include local namespaces of snapshots by using the snapshot management table 117. Accordingly, access from the clients 126 to the snapshots becomes easier.

Embodiment 5

Embodiments 1 to 4 have been described for the case where a global namespace is constructed to include local namespaces of snapshots obtained at a certain point in time. In Embodiment 5, a plurality of global namespaces is constructed when each NAS server obtains snapshots at different points in time.

However, because the processing sequence for constructing the global namespace to include local namespaces of snapshots at each point in time is identical to that described in any of Embodiments 1 to 4, the description will be omitted.

Figure 16:
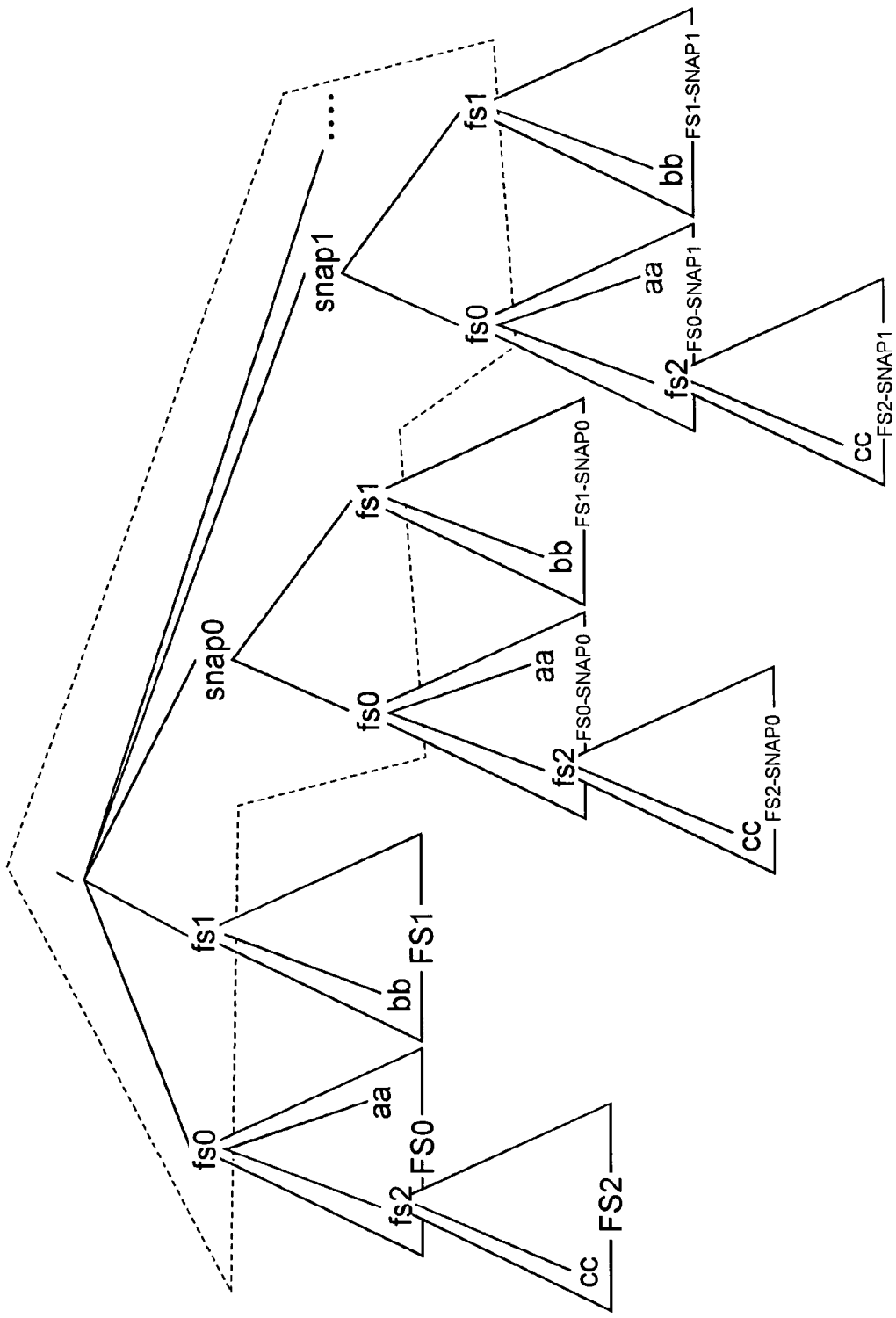
FIG. 16 is a diagram illustrating an example of the directory configuration of a global namespace of a plurality of snapshots in the present invention.

FIG. 16 shows an example of the configuration in the global namespace including local namespaces of a plurality of snapshots according to the present embodiment.

Figure 13:
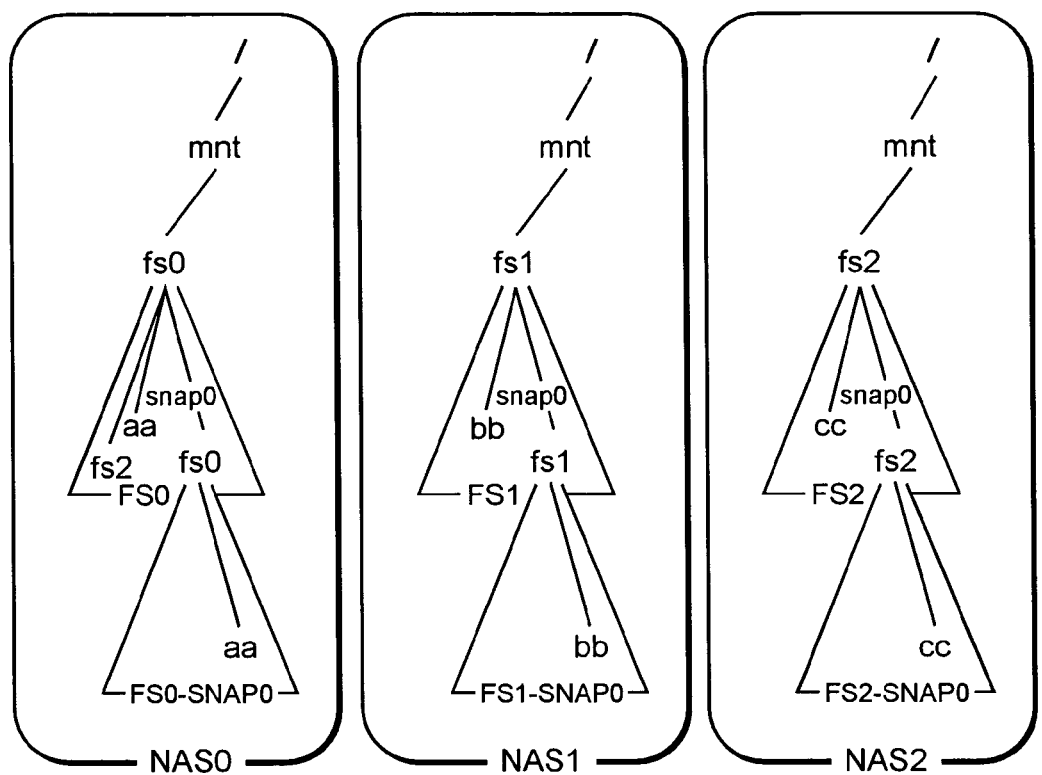
FIG. 13 is a diagram illustrating the directory configuration of a conventional file system.
Figure 14:
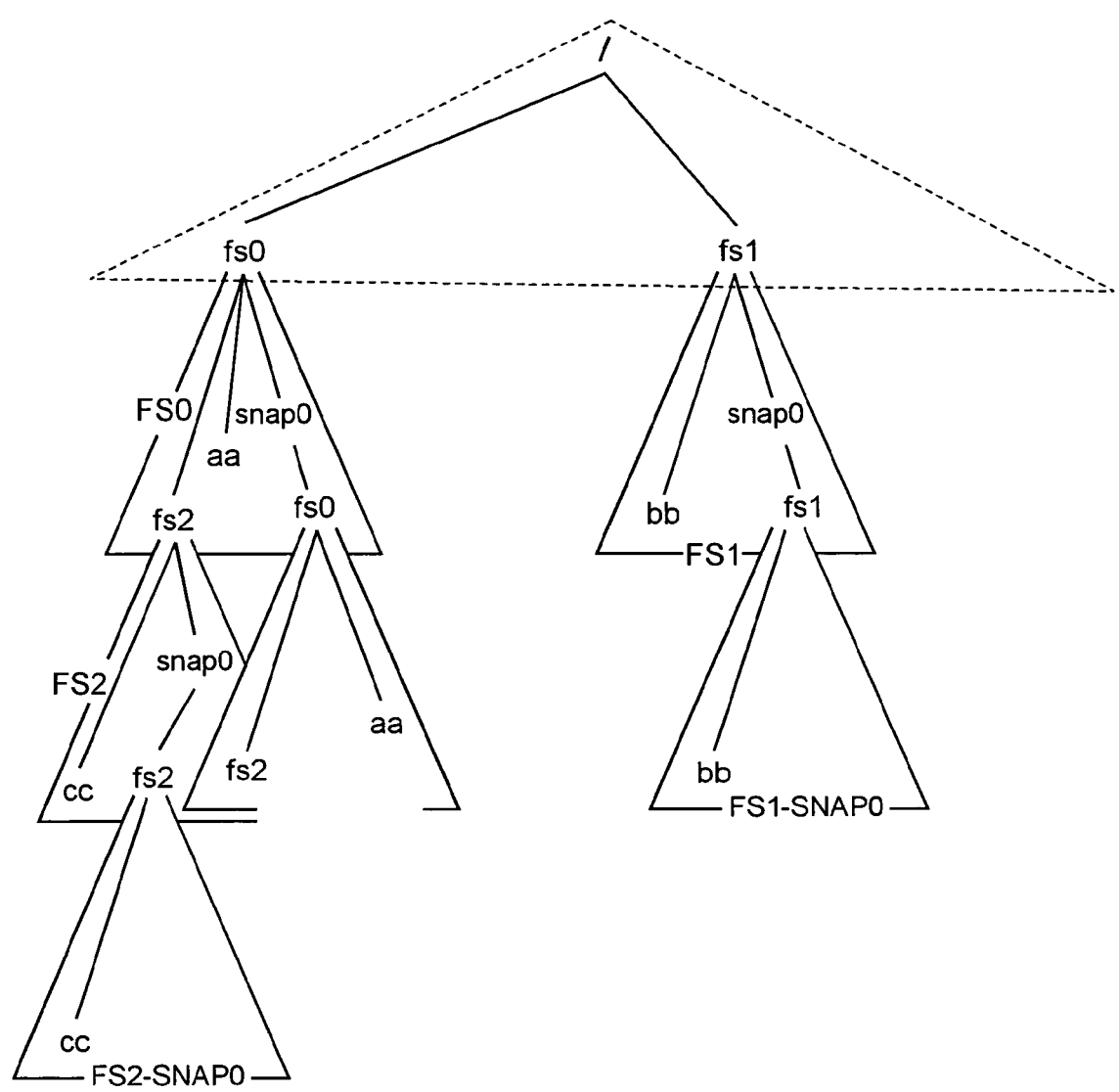
FIG. 14 is a diagram illustrating the directory configuration of a conventional global namespace.
Figure 15:
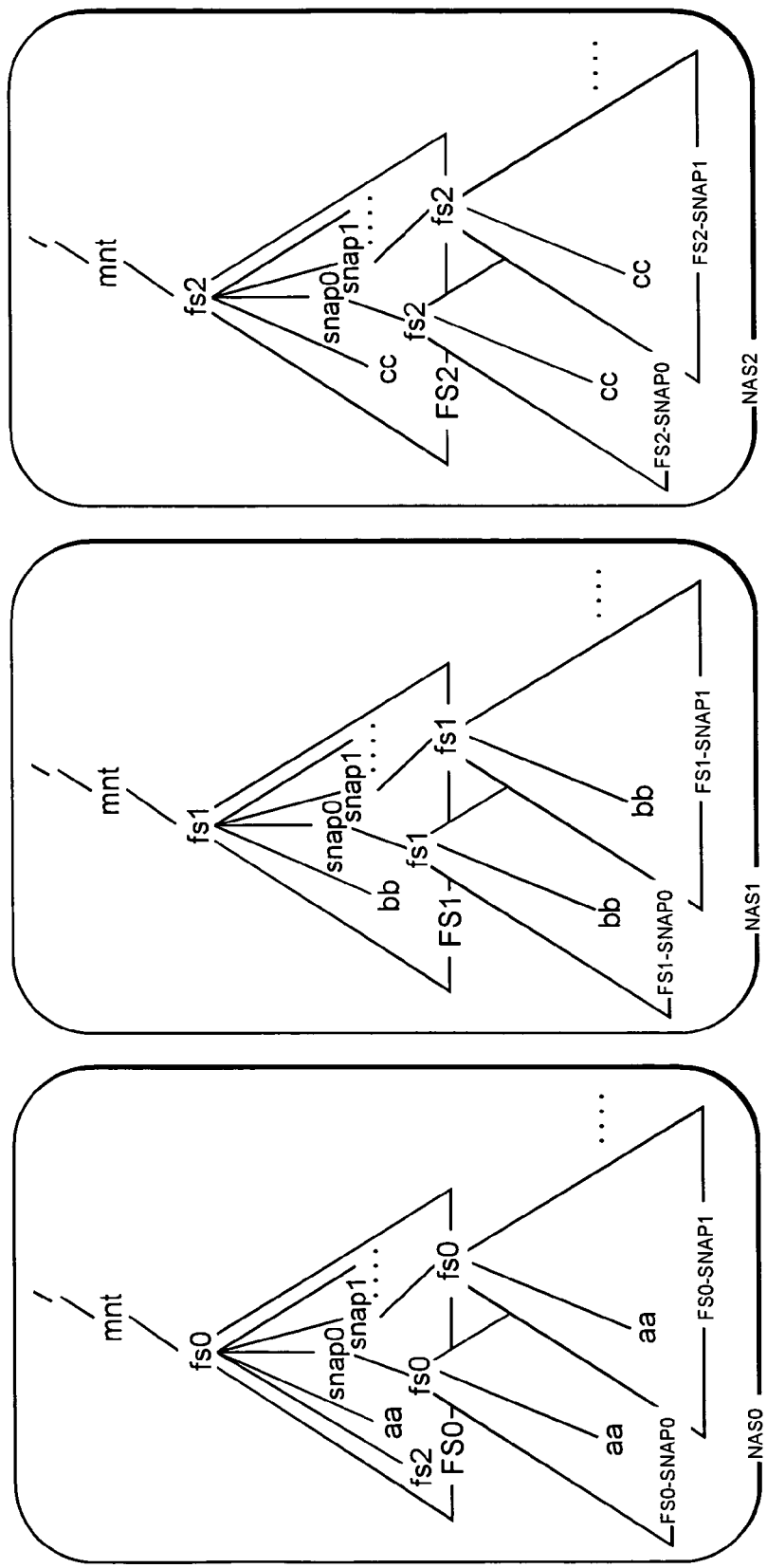
FIG. 15 is a diagram illustrating an example of the directory configuration of a conventional file system to which a plurality of snapshots is mounted.

For example, when the snapshot obtained by each NAS server 110 at a certain point in time is mounted to a local path, as shown in FIG. 13, and a global namespace including the local namespace of the snapshot is constructed on the root "/snap0" according to the sequence described in any of Embodiments 1 to 4, the snapshot obtained by each NAS server 110 at the next point in time is mounted to a local path including "/snap1" as shown in FIG. 15, and a global namespace including the local namespace of that snapshot can also be constructed on the root "/snap1" as shown in FIG. 16, according to the processing sequence described in any of Embodiments 1 to 4.

In the same manner, global namespaces including snapshots obtained at several points in time can be constructed on the roots "/snap2," "/snap3," . . . etc.

Also, the snapshot management table 117 at each point in time may be obtained by the snapshot instruction management program 1103 in the computer 125 from the NAS servers 110, transmitted to the user interface program 1102, and output by the user interface program 1102 to the management display 1901 shown in FIG. 18.

In the management display 1901 in FIG. 18, a snapshot acquisition time 1903, a file system 1904, and a local path 1905 that a snapshot corresponding to a snapshot identifier 1902 is mounted to are presented for each snapshot identifier 1902. Regarding any snapshot that has not been obtained successfully, the local path is not displayed, as in the entry in the file system column 1904 for FS0 corresponding to the snapshot identifier 1902 which indicates SNAP2. When a new file system is added to the global namespace, a new file system column 1904 is added and the local path 1905 for a snapshot corresponding to the snapshot identifier 1902 obtained thereafter is written. When a file system is deleted, the file system column 1904 is not changed, but the local path 1905 is not written there in the entry corresponding to the identifier of a snapshot obtained after the file system is deleted. Accordingly, even when the configuration in the global namespace is changed, the changes can be managed in the management display 1901.

What is claimed is:

1. A storage system comprising:
   a storage device for storing a file;
   a plurality of file systems for managing the file; and
   a plurality of NAS servers that control access from a client to the file systems via a global namespace formed by grouping local namespaces for the one or more file systems;
   wherein,
   each NAS server includes a memory to store global namespace management information including global paths of the file systems;
   one NAS server of the NAS servers accepts a request to obtain snapshots of the file systems from external of the storage system;
   the one NAS server instructs itself and the other NAS servers to obtain snapshots of the file systems;
   the one NAS server and the other NAS servers obtain the snapshots of the file systems, and inform the one NAS server of snapshot identifiers and of local paths of the snapshots;

the one NAS server makes snapshot management information including global paths of the snapshots based on each of the snapshot identifiers received from the other NAS servers and each of the global paths of file systems corresponding to the snapshots, included in the namespace management information so that both the global paths of the file systems and the global paths of the snapshots are configured on the same global namespace simultaneously, with a directory configuration of the snapshots being same in configuration layout as a directory configuration of the file systems; and the one NAS server informs the other NAS servers of the snapshot management information.

2. The storage system according to claim 1, wherein the NAS server further includes a snapshot acquisition instruction means for instructing itself or other NAS servers to obtain a snapshot of a designated file system, wherein the global snapshot construction means arranges the snapshot global namespace portion corresponding to the snapshot obtained according to the instruction, to have a same directory configuration as a directory configuration of the designated file system within the primary global namespace portion.

3. The storage system according to claim 2, wherein the NAS servers operate synchronously with each other, any one of the one or more NAS servers instructs other NAS servers to obtain a snapshot of the designated file system according to a predetermined schedule, and the global snapshot construction means of the other NAS servers arranges the snapshot global namespace portion corresponding to the snapshot obtained according to the instruction, to have a same directory configuration as a directory configuration of the designated file system within the primary global namespace portion.

4. A storage system comprising:
a computer;
a storage device for storing a file;
a plurality of file systems for managing the file; and
a plurality of NAS servers that control access from a client to the file systems via a global namespace formed by grouping local namespaces for the plurality of file systems;
wherein
the NAS servers are configured to accept instruction from the computer, to obtain snapshots of the file systems;

the NAS servers are configured to obtain the snapshots of the file systems, and inform the computer of snapshot identifiers and of local paths of the snapshots;

the computer is configured to make snapshot management information including global paths of the snapshots based on each of the snapshot identifiers and each of global paths of the file systems corresponding to the snapshots, so that both of the global paths of the file systems and the global paths of the snapshots are configured on the same global namespace simultaneously, with a directory configuration of the snapshots being same in configuration layout as a directory configuration of the file systems; and the NAS servers are configured to receive the snapshot management information from the computer.

5. The storage system according to claim 1 wherein the file systems include a first file system and a second file system and the first file system is a file system on a hierarchical level upper than that of the second file system, after the one NAS server instructs the other NAS servers to obtain a snapshot each of the other NAS servers obtains a snapshot of the first file system, and when any of the other NAS servers fails to obtain a snapshot of the first file system, the one NAS server creates a pseudo file system for connecting to the second file system and constructs a global names space including the pseudo file system.

6. The storage system according to claim 4, wherein the file systems include a first file system and a second file system and the first file system is a file system on a hierarchical level upper than that of the second file system, after the one NAS server instructs the other NAS servers to obtain a snapshot each of the other NAS servers obtains a snapshot of the first file system, and when any of the other NAS servers fails to obtain a snapshot of the first file system, the one NAS server creates a pseudo file system for connecting to the second file system and constructs a global names space including the pseudo file system.

* * * * *